United States Patent [19]

Goodman et al.

[11] 4,018,327
[45] Apr. 19, 1977

[54] HANGER CONVEYING SYSTEM

[75] Inventors: Walter P. Goodman, New Albany, Ind.; Laddie A. DePas, Louisville, Ky.

[73] Assignee: W. M. Cissell Manufacturing Company, Louisville, Ky.

[22] Filed: Feb. 18, 1976

[21] Appl. No.: 659,161

[52] U.S. Cl. .............................. 198/723; 198/347; 198/465; 198/473; 198/655; 198/733; 198/836

[51] Int. Cl.² ...................................... B65G 47/08

[58] Field of Search ................. 198/25, 26, 28, 40, 198/129, 130, 168, 347, 465, 481, 473, 655, 723, 733, 836, 857, 611

[56] References Cited

UNITED STATES PATENTS

| | | | |
|---|---|---|---|
| 2,449,669 | 9/1948 | Pohlers | 198/168 |
| 2,536,575 | 1/1951 | Seldin | 198/168 |
| 2,761,363 | 9/1956 | Sausele | 198/26 X |
| 2,998,136 | 8/1961 | Gerisch | 198/168 X |
| 3,039,588 | 6/1962 | Harnack | 198/26 |
| 3,105,584 | 10/1963 | Helland et al. | 198/26 |
| 3,321,064 | 5/1967 | Sanders et al. | 198/40 X |
| 3,395,784 | 8/1968 | Kanarek | 198/26 X |
| 3,454,148 | 7/1969 | Harrison | 198/28 |
| 3,511,359 | 5/1970 | Gerisch | 198/28 X |
| 3,799,318 | 3/1974 | DeKoekkoek | 198/26 |

FOREIGN PATENTS OR APPLICATIONS

746,745  11/1966  Canada ................. 198/28

*Primary Examiner*—Evon C. Blunk
*Assistant Examiner*—Richard K. Thomson
*Attorney, Agent, or Firm*—Wood, Herron & Evans

[57] ABSTRACT

A hanger conveying system which routes hangers from a main screw conveyor onto a conveyor branch where they are transported through a processing station and thence returned to the screw conveyor at a point downstream from that where they were initially removed. Included in the conveyor branch is an endless conveyor of hinged links each having a plurality of hanger hook receiving slots or apertures. Also provided is a downwardly inclined input slick rail which picks off hangers from the main screw conveyor, and a cooperating peripherally notched disc which is spaced in close proximity to a curved section of the input slick rail located at the lower extremity thereof. The disc captures, in its notches, hanger hooks which have been picked off the main screw conveyor and are stacked at the bottom of the inclined input slick rail, and individually feeds the captured hangers in spaced relation to an output slick rail which is upwardly inclined. Associated with the output slick rail are chain-driven pins which move in synchronism with the notched disc along a path parallel to the output slick rail. The chain-driven pins positively advance the spaced hangers up the output slick rail, maintaining their spacing, eventually depositing them in the hanger-receiving slots of the endless conveyor links. The hangers, once on the endless conveyor, are transported through a processing station. At the output end of the processing station, a slick rail and cooperating notched disc and set of chain-driven pins positively feed hangers, which have been picked off the endless conveyor by the slick rail, to the main screw conveyor where they are deposited for transport thereby.

11 Claims, 14 Drawing Figures

HANGER CONVEYING SYSTEM

This invention relates to conveyors for transporting hook-bearing hangers from which articles, such as garments, are suspended, and more particularly to garment hanger conveying systems which positively engage and transport hangers along a slick rail between a main conveyor located at one elevation and a branch conveyor located at a different elevation.

In conveying garments from one place to another in a garment processing operation there are a number of conveying schemes commonly in use. Among these are screw conveyors along which garment hangers are advanced by the threads of the rotating screw, endless conveyors having hinged links with slotted apertures for receiving individual garment hanger hooks and positively transporting them as the conveyor moves, and slick rails on which hangers slide from one point to another. Slick rails are also extremely useful for both pick off and delivery of hangers relative to moving conveyors of the screw or hinged-link type.

Slick rails, in view of their structural simplicity, are extremely economical and easy to install. However, in certain situations there are two disadvantages which inhere in the use of slick rails as a pick-off and/or delivery device.

First, where a slick rail is to be used to transport articles without outside motive assistance, i.e., relying solely on gravity as the motive force to move the hanger from one point to another, the slick rail must be angled downwardly. This, of course, creates no problem if the slick rail is being used to transport hangers from a higher elevation to a lower elevation, for example, from a main screw conveyor to a processing branch conveyor. However, when it is necessary to return the hanger to the main conveyor, such as after processing, the hanger must be moved from a lower elevation to a higher elevation. In such case the slick rail alone is insufficient for hanger transfer, and positive hanger drive means must be provided as an adjunct to the slick rail to advance the hanger up the rail.

Second, even where slick rails are used to transfer hangers from an upper elevation to a lower elevation, such as from a main conveyor to a branch conveyor at a processing station, and outside motive assistance are not necessary, the need often arises to feed the hangers to the lower elevation conveyor at predetermined spaced intervals such as not to crowd the hangers when deposited on the lower conveyor. However, when a slick rail is used to deliver hangers from a higher elevation to a lower elevation the hangers stack up at the bottom of the slick rail unless they are transferred to the lower conveyor as quickly as they arive, which is not possible if the lower conveyor is operated on an intermitten basis, such as in a batch type processing operation. Under such circumstances, the hangers delivered from the higher conveyor stack up, or bunch, at the bottom of the slick rail. When this occurs apparatus must be provided to separate the bunched hangers and feed them individually on a spaced basis to the lower conveyor.

Accordingly, it is an objective of this invention to provide, in a hanger transfer system which uses slick rails to transfer hangers between a main conveyor and a branch conveyor at different levels, a hanger transport mechanism which transports hangers on an individual spaced-apart basis from a downwardly inclined input slick rail, whereat the hangers are backed up, to a second, or output, slick rail. This objective is accomplished in accordance with a preferred embodiment of this invention by providing, between the input and output slick rails, the combination of a peripherally notched disc and a concavely curved slick rail having a radius of curvature equivalent to that of the disc periphery, the disc periphery and curved slick rail being arranged in closely spaced relationship such that, as the disc rotates, hangers stacked up on the input slick rail are captured by the disc notches and sequentially and positively transported to the output slick rail with a spacing corresponding to that of the disc notches.

In accordance with a further aspect of the invention, designed to facilitate delivery of the hangers from the output slick rail to a moving conveyor with a spacing corresponding to that of the disc notches, an endless chain or equivalent is provided having outwardly extending projection or pins. The pin-bearing chain is arranged such that a run is located along the path of the output slick rail between the notched disc and the moving conveyor to which the hangers are to be delivered. As the hangers are fed to the output slick rail by the notched disc, they are engaged by the chain-mounted pins which move along the path of the output slick rail and advanced therealong for delivery to the moving conveyor at the desired predetermined spacing established by the notches in the disc. An advantage of the output slick rail/pin-bearing chain combination, in addition to maintaining the disc-established spacing of the hangers as they move along the output slick rail, is that the output slick rail can be inclined upwardly such that the chain-driven pins deliver the hangers to a higher elevation while maintaining the spacing between the hangers established by the notched disc.

In a preferred embodiment of the invention the notched disc, pin-bearing chains and moving conveyor are driven from a common drive, thereby assuring synchronism between the driven members and, in turn, maintenance of the spacing between the hangers as they move from the input slick rail to the moving conveyor via the output slick rail. In addition, in the preferred embodiment the moving conveyor operates on an intermittent, or barch, operational basis. As such, the notched transfer disc is also intermittently driven. In this preferred embodiment it is desired to deliver spaced hangers to the moving conveyor in groups of, for example, 15 hangers, with a space between the adjacent groups of hangers which substantially exceeds the spacing between individual hangers of any given group. This requires that the notched disc be driven for a lesser interval than the moving conveyor.

Under such circumstances, when the notched disc is driven in synchronism with the moving conveyor through a common drive system but for a lesser interval, it is necessary to periodically engage and disengage the drive connection between the notched disc and the moving conveyor. To insure that the notched disc always assumes the same rotational position at the end of a batch transfer cycle, such that at the beginning of the next batch transfer cycle its position will be the same as at the start of the preceding transfer cycle, a cam is provided which is mounted for rotation with the notched disc and an associated cam-operated switch which controls clutch disengagement, and hence the disc stop/start position. The cam configuration is designed such that the switch is actuated to disengage the clutch and terminate rotation of the notched disc when the notched disc has reached the predetermined desired stop/start, or home, position. In this way, the stop/start position of the notched disc is under the direct conrol of a switch-operating cam which moves with the notched disc. Since the notched disc and switch-operating cam move as a unit there can, from cycle to cycle, be no mechanical drift or loss of synchronism therebetween, with the result that the clutch is disengaged to terminate drive to the notched disc at the same point of disc rotation every cycle, in turn maintaining the disc stop/start, or home, position constant from cycle to cycle.

These and other advantages, features and objectives of the invention will become more readily apparent from a detailed description thereof taken in conjunction with the drawings in which.

Figures 1, 2, 10:
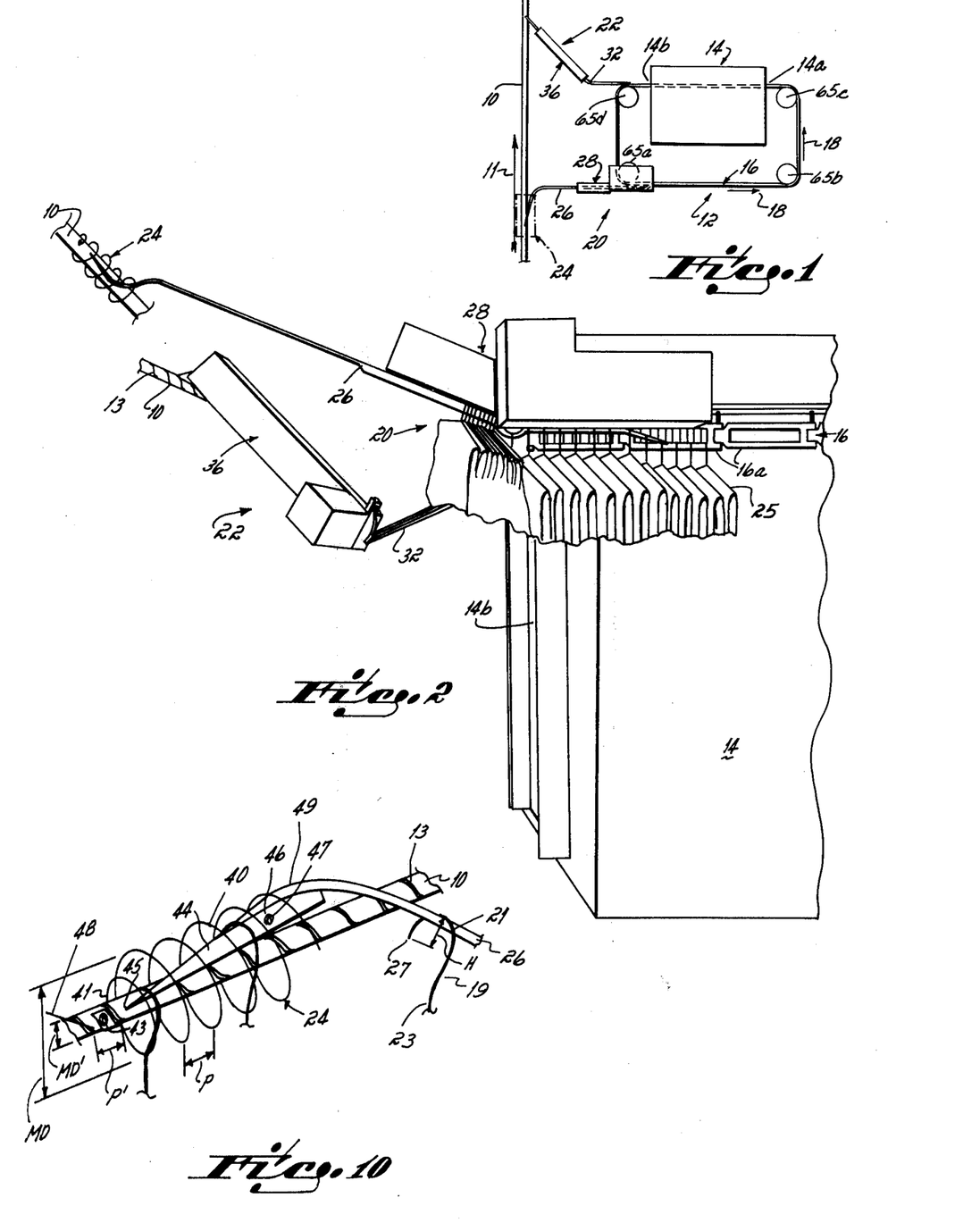
FIG. 1 is a top plan view, in schematic format, of the hanger conveying system of this invention.
FIG. 2 is a perspective view of the hanger conveying system.
FIG. 10 is a perspective view of the helix transfer mechanism.

With reference to FIG. 1, the hanger conveying system of this invention is seen to include a main hanger conveyor 10, which preferably takes the form of a screw, and a branch conveyor 12. The screw conveyor 10 is constructed and rotated to advance hangers suspended therefrom in the direction of arrow 11. The branch conveyor 12 includes a processing station 14 which, in a preferred form, may include a garment finishing tunnel through which garments suspended on hangers are passed to undergo a de-wrinkling process. The processing station 14 itself forms no part of this apparatus and may, for example, be constructed in accordance with the disclosure of U.S. Pat. No. 3,732,628, issued May 15, 1973, assigned to the assignee of the present invention. Associated with the processing station 14 and included in the branch conveyor 12 is an endless conveyor 16 which is driven in the direction of arrow 18 to pass garments on hangers suspended from the conveyor 16 through the processing tunnel 14 via the entrance 14a and exit 14b. The endless conveyor 16 is intermittently driven to deliver the garments to the tunnel 14 in batches wherein they remain for a predetermined processing interval. Also included in the branch conveyor 12 is a hanger loading sub-system 20 and a hanger unloading sub-system 22 for transferring hangers from the main screw conveyor 10 to the endless conveyor 16 for input to the processing tunnel entrance 14a and from the endless conveyor 16 proximate the processing tunnel exit 14b to the main conveyor 10, respectively.

With reference to FIGS. 1 and 2, the hanger loader sub-system 20 includes a helix transfer mechanism 24 (FIG. 10) which picks off hangers 19 moving along the main conveyor 10 in the direction of arrow 11 and transfers them to a downwardly inclined slick rail 26 where they move under the force of gravity to an endless conveyor loading mechanism 28 which transfers them from the slick rail 26 to the endless conveyor 16. The helix transfer mechanism 24 preferably is constructed in accordance with the disclosure of U.S. patent application Ser. No. 639,715 in the name of Laddie DePas et al, assigned to the assignee of this application.

Figures 7, 8, 9:
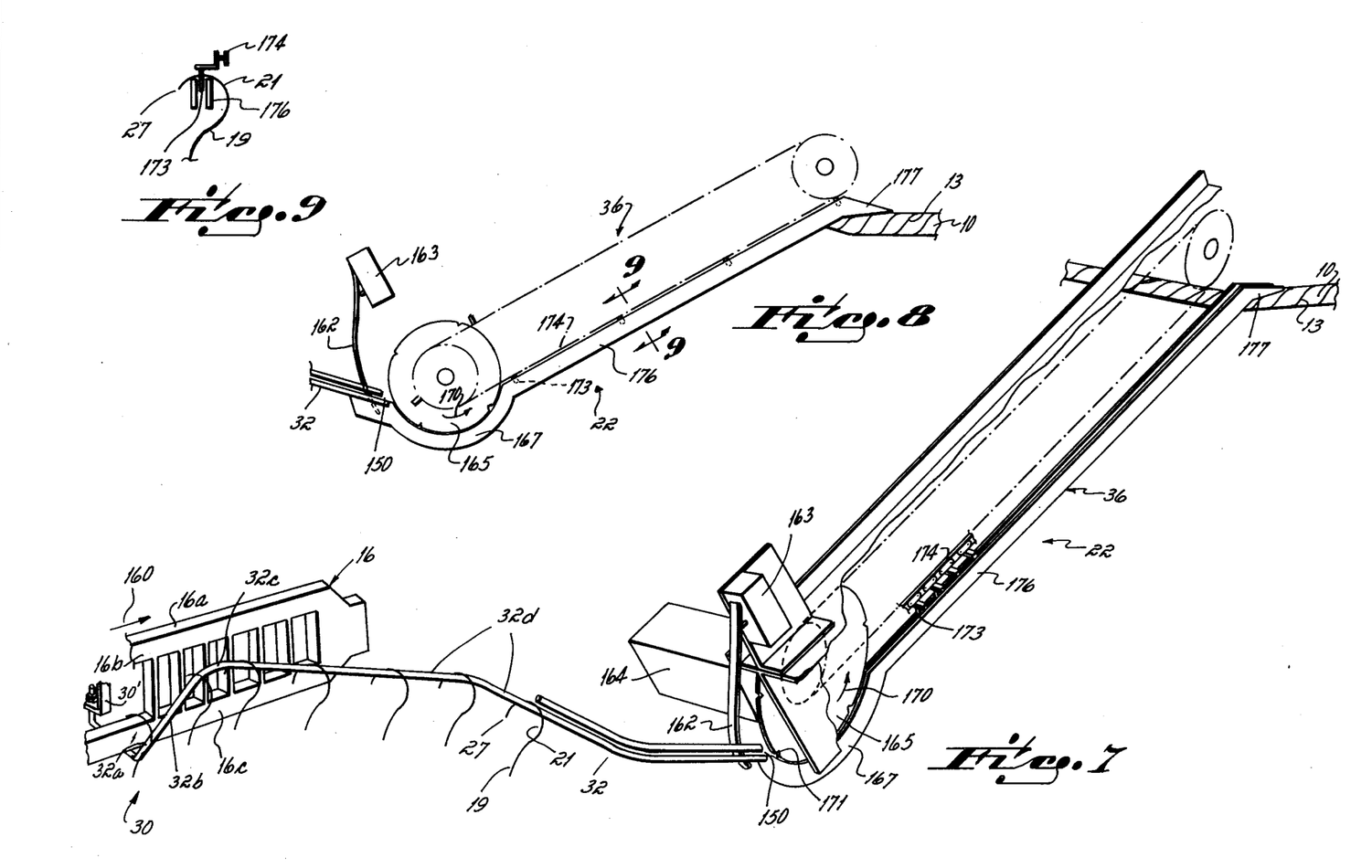
FIG. 7 is a perspective view of a hanger unloading sub-system for transferring hangers from the endless branch conveyor which passes through the processing station to the main screw conveyor.
FIG. 8 is a side elevational view of the anger unloading sub-system shown in FIG. 7.
FIG. 9 is a cross-sectional view taken along line 9—9 of FIG. 8.

The hanger unloading sub-system 22 includes as shown in FIG. 7, a conventional pick off 30 which transfers hangers 19 from the endless conveyor 16 proximate the processing tunnel exit 14b to a downwardly inclined slick rail 32. The hangers 19 removed from the endless conveyor 16 proximate the tunnel exit 14b slide down under the force of gravity to the bottom of the slick rail 32 where they are transferred to the main screw conveyor 10 by a screw conveyor loader 36.

The screw conveyor 10, as shown in FIG. 10, preferably is in the nature of an extended length rod having a screw thread 13 on the exterior surface thereof, the threads having a substantial pitch such that a hanger hook 21 engaged in a thread 13 will advance axially along the length of the screw conveyor a substantial distance for each rotation of the screw. A motor drive mechanism (not shown) is interconnected with the screw conveyor 10 to rotate it in the direction necessary to advance hangers in the direction of arrow 11. Each hanger 19, in addition to the hook portion 21, also includes a stem portion 23, and garment support or frame portion 25. The hook 21 is open, terminating at hook end 27, to facilitate placement and removal of the screw conveyor 10.

The helix transfer mechanism 24, as shown in FIG. 10, basically comprises a helix 40, for example, of wire, fixed at its leading end 41 by screws 43, to the screw conveyor 10. The helix 40 is concentrically disposed with respect to the axis of the screw conveyor 10, and the major diameter MD of the helix 40 is preferably substantially greater than the major diameter MD' of the screw conveyor 10. Further, it is preferred that the pitch P of the helix 40 be approximately the same as the pitch P' of the threads of the screw conveyor. The major diameter MD of the helix 40 must be such as to permit a pick-off finger 44 to be interposed between the helix and the screw conveyor 10. The pick-off finger 44 is in the nature of an elongated, substantially linear structural element that tapers to a tip 45 at its leading end. The pick-off finer 44 is positioned to extend generally longitudinally of the screw conveyor 10 within the annular spatial cavity between the exterior surface of the screw conveyor and the helix 40. The pick-off finger 44 is pivotally connected, as at 46, to the upper end of the slick rail 26 at a spatial location adjacent to the helix 40. The pivotal connection 46 of the pick-off finger 44 with the slide rod 26 permits movement of the pick-off finger between a hanger pass-through position and the hanger transfer position illustrated.

Referring to FIG. 10, in the hanger pass-through position, the elongated pick-off finger 44 is oriented substantially parallel to the longitudinal screw conveyor axis, and is retained in that position by screw 47. The pivotal connection 46 of pick-off finger 44 and slick rail 26 must be positioned such that the pick-off finger will be spaced a distance from the exterior surface of the screw conveyor 10 sufficient to permit hangers 19 on the screw conveyor to pass beneath the finger 44 without being impeded in their progress along the directional path 11. In the hanger pick-off position, the pick-off finger tip 45 is juxtaposed to the surface of the screw conveyor 10 and is restrained in that position by screw 47. The location of that juxtaposition between the pick-off finger tip 45 and the screw conveyor exterior surface is such that the hanger hook 21 will pass over the pick-off finger tip and ride up onto the finger 44.

Referring to FIG. 10, the spatial orientation of the combined pick-off finger 44 and the upper end of the slick rail 26, vis-a-vis the screw conveyor 10, is important to insure reliable operation of the pick off device when the finger 44 is in the hanger pick off position. When in the hanger take-off position, the pick-off finger 44 should angle upwardly relative to the screw conveyor 10 from a position at which the finger tip 45 is disposed beneath a horizontal plane 48 which is tangent to the top of the screw conveyor. This take off position of the finger tip 45 insures that a hanger hook 21 will embrace both the finger and the screw conveyor when the finger is in the pick-off position. The pick-off finger 44 and the upper end of the slick rail 26 preferably should also cooperate to define a hump 49 substantially above horizontal plane 48, i.e., above the screw conveyor 10, with the hump being upraised above the plane 48 a distance at least equal to the height H of the hook 21. This is preferable to permit the free end 27 of the hanger hook to clear the screw conveyor 10 as the hanger 19 is lifted up relative to the screw conveyor and on to the upper end of the slick rail 26. The helix 40, rotating with the screw conveyor 10, cooperates with the hanger stem 23, to force the hanger up the pick-off finger 44 over the hump 49 and onto the upper end of the slick rail 26 once the hanger hook 21 has left its conveying relationship with threads on the screw conveyor 10.

Assuming the threaded screw conveyor 10 is rotating in the appropriate direction, hangers 19 will be advanced along the screw conveyor in the direction of arrow 11 (FIG. 1). With the pick-off finger 44 in the position shown (FIG. 10), as hangers 19 advance, each hanger hook 21 is disposed over the tip 45 of the pick-off finger 44. The helix 40 engages the hanger stem 23 as the hanger is conveyed into the helix area so as to continue pushing the hangers along the screw conveyor 10 in accord with directional arrow 11, thereby continually pushing the hangers 19 in a positive manner up onto the pick-off finger 44 after the hangers have been removed from driving or conveying engagement with the screw conveyor 10. The helix 40 continues to positively drive successive hangers 19 up onto and along the pick-off 44 until they pass over the pick-off device hump 49 at which point the hangers have been lifted off the threaded screw conveyor 10 a distance that permits them to be branched, or directed, off onto the slick rail 26. The slick rail 26 is angled downwardly from the hump 49 so that a gravity assist is provided to the hangers 19 to move them away from the screw conveyor 10 along the slick rail 26.

Alternatively, referring to FIGS. 1 and 10, and if it is not desired to pick-off hangers 19 from the screw conveyor 10 to route them to the branch conveyor 12, the pick-off finger 44 is raised from position, allowing the hangers to pass beneath the tip 45 and thus through the helix without being picked off. In this operational attitude, the helix 40 may engage the hanger stems 23 as the hangers pass through the helix, in which case the hanger is simply positively driven by the helix as well as by the threads. An important point is that the pick-off finger 44, having been disposed substantially parallel to and spaced above the screw conveyor 10 is no longer accessible to the hangers and the hanger hooks 21 cannot ride up thereon. Hence, the hangers 19 simply pass along the screw conveyor 10 without being picked off and routed to the branch conveyor 12.

Hangers which are removed by the helix transfer mechanism 24 from the main screw conveyor 10 slide downwardly along the input slick rail 26 to the lower portion thereof. To avoid crossing of the hanger hooks on the slick rail 26 a restraining bar 60 (FIG. 4) is spaced slightly above the upper surface of the input slick rail 26 a distance slightly in excess of the thickness of the wire constituting the hanger hook 21. With the restraining bar 60 so positioned, a longitudinal slot is established between the slick rail 26 and the restraining bar 60 which is sufficient to let the hanger hooks 21 slide down input slick rail 26, but insufficient to let hooks of adjacent hangers cross over one another. The hangers which are picked off by the helix transfer mechanism 24 stack up on the input slick rail 26 until they are transferred to the endless conveyor 16 by the endless conveyor loading mechanism 28 to be described.

Referring to FIGS. 4–7, the endless conveyor 16, to which the stacked-up hangers on the input slick rail 26 are transferred by the loading mechanism 28, includes a series of elongated hinged links 16a. Each of the hinged links 16a consists of an elongated upper horizontal bar 16b, an elongated bottom horizontal bar 16c, and a series of equally spaced vertical dividers 16d, 16d which are fixed to and span the upper and lower bars 16b and 16c. The vertical dividers 16d, 16d serve to positively locate the hanger hooks 21 at horizontally spaced locations along the links 16a. Vertical pins 16f serve as hinge pins between pivotally interconnected ends 16g and 16h of adjacent links 16a, 16a. The hingedly interconnected links 16a, 16a which collectively form the endless conveyor 16 train around four horizontally disposed sprockets 65a, 65zb, 65c, and 65d disposed at opposite corners of the endless conveyor 16. The sprockets 65a and 65b are mounted for rotational movement about vertical axes by suitable means (not shown). At least one of the sprockets 65b is driven by a motor EM in the counterclockwise direction 66 to drive the endless conveyor 16 in the direction of arrow 18.

Figure 4:
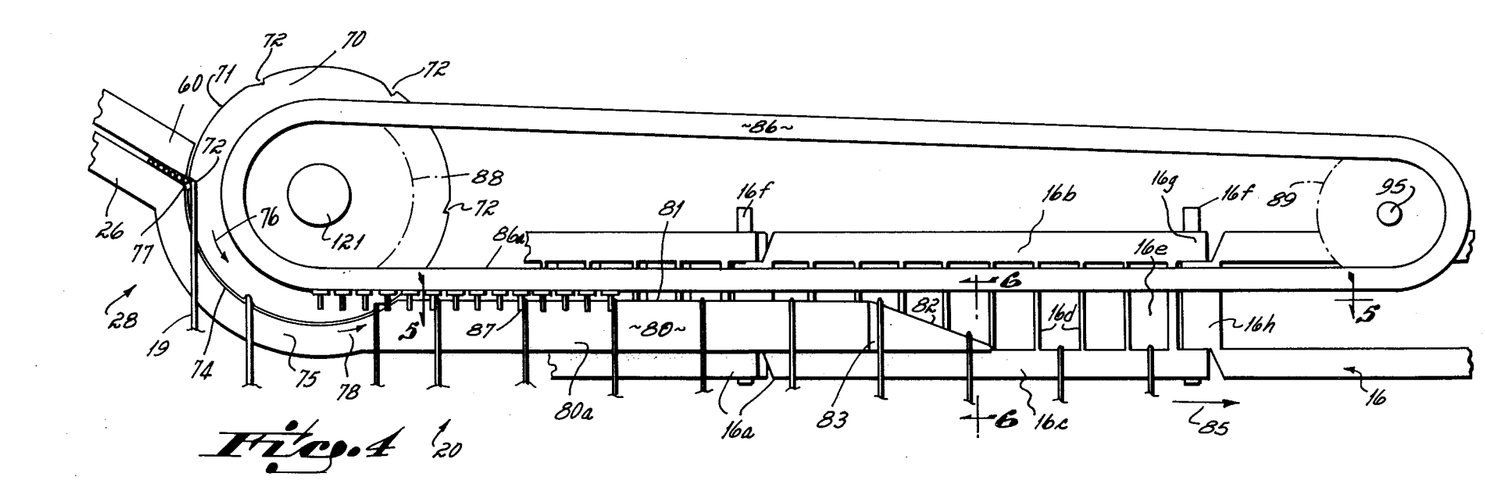
FIG. 4 is a side elevational view of the hanger loading sub-system shown in FIG. 3.
Figures 5, 6:
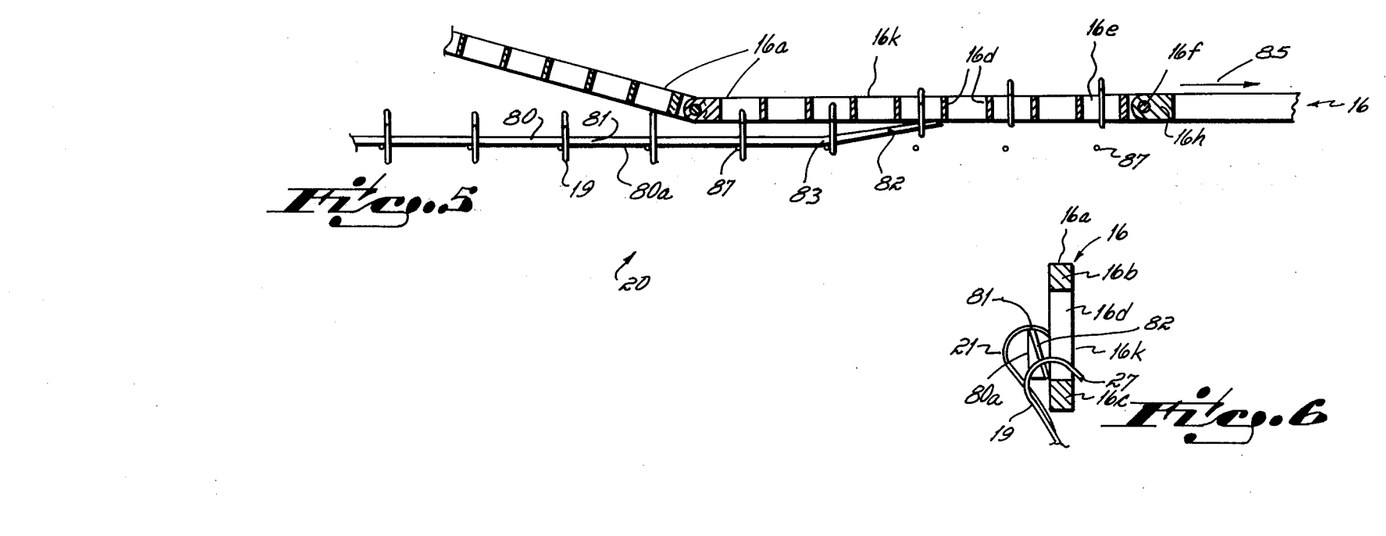
FIG. 5 is a cross-sectional view taken along line 5—5 of FIG. 4.
FIG. 6 is a cross sectional view taken along line 6—6 of FIG. 4.

Referring to FIG. 4, the conveyor loading mechanism 28 includes a circular disc 70 mounted for rotation about a horizontal axis. The periphery 71 of the disc 70 is provided with notches 72 at equally spaced intervals. The diameter of the disc 70 is selected such that it is equal to the radius of curvature of the upper edge 74 of a curved slick rail section 75 which is located to underlie approximately one-third of the edge 71 of the disc 70. As the disc 70 rotates in a counterclockwise direction as viewed in FIG. 4 in the direction of arrow 76, the notches 72 successively pass past the exit end 77 of the spaced slick rail 26 and restraining bar 60, As each notch 72 moves past exit end 77 the lowermost hanger hook 21 stacked on the slick rail 26 moves under the force of gravity into the notch where it is captured. Continued rotation of the disc 70 positively advances the captured hanger hook 21 along the edge 74 of slick rail 75 in the direction of arrow 78.

Referring again to FIG. 4, the spacing between the peripheral edge 71 of the disc 70 and the upper edge 74 of th curved slick rail 75 is less than the diameter of the wire which forms the hanger hook 21. With the spacing between edges 71 and 74 so selected the spacing between captured hangers engaged by disc notches 72 is maintained as the disc rotates advancing the hangers along the slick rail edge 74 in the direction of arrow 78. The size of the notches 72 is selected such that only one hanger hook 21 will be captured in each notch as the notches pass past the exit end 77 of slick rail 26.

Associated with the notched disc 70 and the curved slick rail 75 is a horizontal slick rail 80 having an upper horizontal edge 81 which at its rightward extremity 83, as viewed in FIG. 4, tapers downwardly to form an inclined delivery edge 82. The slick rails 26, 75, 80 and 83 and their respectively associated upper edges 74, 81 and 82, in a preferred form of the invention are continuous, that is, formed as an integral structural member. Relative to the links 16a, the upper edge 82 of the slick rail section 83 is located such that hangers sliding along the edge 82 will gradually merge toward the link 16a of the endless conveyor 16 which is positioned adjacent the right hand end 83 of the slick rail section 80. To facilitate this gradual merger, the right hand end 83 of the slick rail section 80 bearing downwardly inclined edge 82 is angled inwardly toward the link 16a which is adjacent thereto. With the slick rail end section 83 so angled, a hanger moving down the inclined edge 82 under the force of gravity will also move inwardly toward conveyor link 16a such that the end 27 of the hook 21 will pass through slot 16e and be inboard of the inner surface 16k of the link 16a permitting the hook to engage the lower bar 16c of the link 16a. Once the hook is engaged with the lower bar 16c of the link 16a, as the link moves in the direction of arrow 85, rightwardly as viewed in FIG. 5, the hook will be supported for movement by the link in a rightwardly direction.

To dirve the hooks rightwardly along the upper horizontal edge 81 of the slick rail section 80, and maintain the proper spacing therebetween such that they will be deposited in separate openings 16e of the links 16a as they slide down the edge 82 of slick rail end section 83, following deposit on the left hand end ofthe slick rail section 80 by the notched disc 70, an endless chain 86 having pins 87 projecting therefrom is provided. The chain 86 trains over sprockets 88 and 89 which are mounted for rotation about horizontally spaced horizontal axes. The sprockets 88 and 89 are located such that the lower run 86a of the chain 86 is spaced slightly above the upper edge 81 of the slick rail section 80 with the lower ends of the pins 87 extending below edge 81 and alongside the outboard vertical surface 80a of the slick rail section 80. With the lower chain reach 86a, pins 87 and slick rail section 80 so relatively positioned, as captured hooks are delivered by disc notches 72 to the lefthand end of the slick rail edge 81, the hooks will be engaged by the pins 87 and moved along the upper edge 81 of the slick rail with the spacing therebetween established by notched disc 70 maintained. This provides orderly, equally-spaced delivery of hangers for deposit onto the links 16a as the hanger hooks slide under the force of gravity down the inclined edge 82 of slick rail end section 83.

Figures 3, 3A, 11, 12, 13:
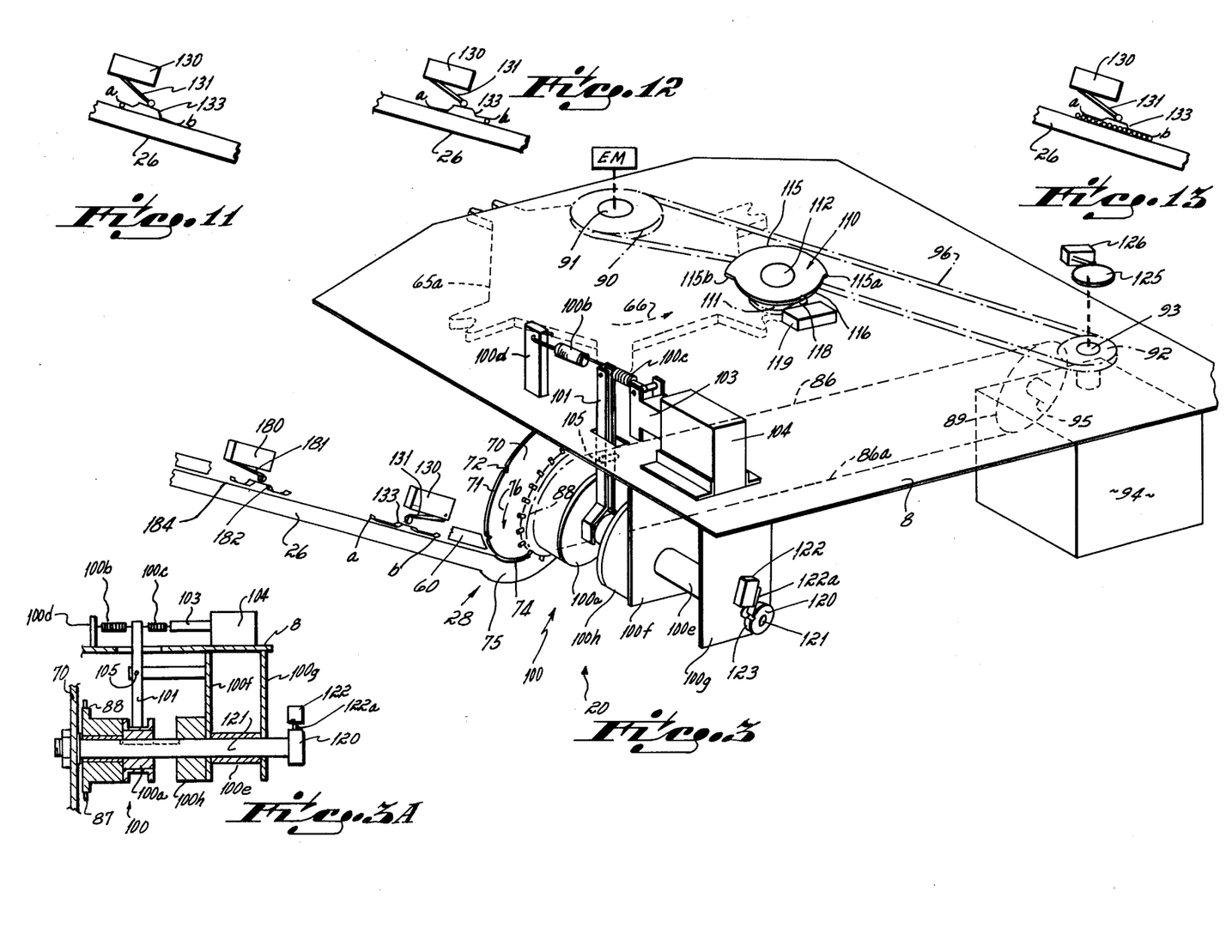
FIG. 3 is a perspective view of a hanger loading subsystem for transferring hangers from a main screw conveyor to an endless branch conveyor which passes through a processing station.
FIG. 3a is an axial diagrammatic cross-sectional view taken through the clutch and brake drive for the hanger loading sub-system.
FIGS. 11 and 12 are side elevational views of the input slick rail showing the switch foot in the position it successively assumes as a hanger slides therebeneath failing to trip the switch.
FIG. 13 is a side elevational view of input slick rail showing the switch foot in the position it assumes when hangers are stacked up on the rail, tripping the switch.

To maintain the spacing of the hanger hooks from the time they are captured via a notch 72 at the exit end 77 of the slick rail 26 until delivery onto the link 16a; in the course of which they are positively driven along slick rail edge 74 by the notched disc 70 and along slick rail edge 81 by the chain driven pins 87; the disc 70, chain 86 and links 16a are driven in synchronism by suitable drive train. The drive train includes, as shown in FIG. 3, a chain sprocket 90 mounted for rotation with the conveyor sprocket 65a. For example, the chain sprocket 90 may be keyed to a vertical shaft 91 to which the conveyor sprocket 65a is also keyed. The shaft 91 is driven by the motor EM which provides the motive force for driving the endless conveyor 61. A second chain sprocket 92 keyed to the vertical input shaft 93 of a gear reducer assembly 94 having an output shaft 95 keyed to chain sprocket 89 is also provided. A chain 96 trains over the sprockets 90 and 92. As the conveyor sprocket 65 rotates to advance the links 16a adjacent the delivery edge 82 of the slick rail end section 83 in the direction of arrow 85, the pin-bearing chain 86 is advanced via a drive train which includes shaft 91, sprocket 90, chain 96, sprocket 92, gear reduction assembly input shaft 93, gear reduction assembly 94, gear reduction assembly output shaft 95 and sprocket 89. Thus, the linear rate of advance in the direction of arrow 85 of the chain-mounted pins 87 is equal to the linear advance of the link 16a located proximate the delivery edge 82 of the slick rail end section 83.

In a preferred embodiment of the invention it is desired to deposit hangers onto groups of adjacent conveyor links 16a with a preset number of empty links provided between adjacent groups of links onto which hangers are deposited. For example, it is preferred to deposit hangers on three adjacent links 16a, deposit no hooks on the next two adjacent links, deposit hooks on the next three adjacent links, deposit no hooks on the succeeding two adjacent links, and so forth. In this way, when a processing tunnel 14 is provided having doors at its entrance and exit ends 14a and 14b, which doors are closed during the garment processing operation, the collective length of the three adjacent hooks on which hangers are deposited will fit comfortably within the processing tunnel between the entrance and exit doors bounded at each end by a pair of hooks on which no garments are deposited.

To facilitate deposit of hangers on groups of three adjacent conveyor links bounded at each end with two conveyor links on which no hooks are deposited, the notched disc 70 is driven for an interval corresponding to the angular distance necessary to pass three adjacent links past the delivery incline 82 of the slick rail end section 83, whereupon rotation of disc 70 is terminated until the endless conveyor 16 is driven for a distance necessary to advance two links past the delivery edge 82 of slick rail end section 83. During the interval that the disc 70 is being driven hangers are captured at the exit end 77 of the input slick rail 26 and transferred to the curved slick rail 75 and on to output slick rail section 80 where they are picked up by the chain driven pins 87 and advanced to the delivery edge 82 of the slick rail end section 83 for deposit on the adjacent conveyor link 16a. *The disc 70 will not rotate for an interval equal to the angular distance needed to advance one conveyor link 16a past slick rail end 83.* The resulting empty link constitutes one of the two empty links between each group of three links receiving hangers. Then the disc 70 is clutched into rotation for the three links to be loaded at a precise advance moment such that the chain 86 will deliver a hanger at the delivery edge 82 at the time the correct link 16a is there to receive it. Hangers deposited on output slick rail 80 before disc 70 stopped are transported along slick rail 80 for delivery to slick rail end section 83 and ultimate deposite on the last of the three conveyor links to receive hangers. During the latter one-half of the interval that disc 70 is stopped and conveyor 16 is moving, equal in distance to that necessary to pass one link 16a past slick rail delivery end 83, no hangers are deposited on the conveyor 16, to produce a second empty link. As a consequence, two links 16a will advance past the delivery end 83 of the slick rail section 80 without hangers being deposited thereon.

To accomplish the foregoing spacing between links having hangers deposited thereon and links not having hangers deposited thereon, a selectively actuated clutch 100 is provided for selectively driving the disc 70 from the driven sprocket 88. The clutch is connected to a two-faced clutch plate 100a, such that as the link 101 pivots about stationary pin 105 the plate 100a will slide axially along shaft 121 while still being keyed thereto and rotatable therewith. At its upper end link 101 is connected to springs 100b and 100c secured to a fixed bracket 100d and a horizontally reciprocable armature 103 of a solenoid 104, respectively. Clutch plate 100a is keyed to a shaft 121 which rotates in a stationary bearing 100e secured to brackets 100f and 100g which depend from a stationary frame 8. Disc 70 and a cam 120 to be described are also keyed to shaft 121. Sprocket 88 over which chain 86 trains is rotatably journaled on shaft 121 between disc 70 and plate 100a. When the solenoid 104 is energized the link 101 pivots clockwise about a stationary pin 105, causing the clutch plate 100a to shift leftwardly into contact with chain-driven sprocket 88, to drivingly connect the chain-driven sprocket 88 and the notched disc 70 through shaft 121. When the clutch is so engaged the notched disc 70 rotates in synchronism with the pin-bearing chain 86 and the endless conveyor 16, transferring hangers from the exit end 77 of input slick rail 26 across the curved slick rail section 75 for deposit on the output slick rail section 80 at a rate equal to the rate at which hangers are deposited on the conveyor link 16 by the delivery end 83 of the slick rail section 80. Since it is desired to load three adjacent links with hangers and not load the next succeeding two adjacent links with hangers, the clutch 100 is engaged for a period of time equal to that necessary to advance three conveyor links past the delivery end 83 of the slick rail section 80, and disengaged for a period of time necessary to advance two links past the delivery end 83 of the slick rail section 80. When the solenoid is de-energized, spring 100b pivots link 101 counterclockwise about pin 105, urging clutch plate 100a rightwardly into engagement with a fixed plate 100h, rotation of plate 100a and the disc 70 and cam plate 120 keyed thereto.

To accomplish the foregoing clutch engagement and disengagement sequence, a cam 110 driven in synchronism with the conveyor 16 and the pin-bearing chain 86 is provided. The cam 110 is fixed to a sprocket 111 mounted for rotation about a vertical shaft 112. The sprocket 111 is engaged with the chain 96 and hence rotates the cam 110 whever the endless conveyor 16 and pin-bearing chain 86 rotate. The cam 110 has an outer cam edge 115 and an inner cam edge 116 about its periphery which cooperate with a movable actuator 118 of a microswitch 119. When the outer cam edge 115 engages the microswitch actuator 118 the solenoid 104 is energized to engage the clutch 100 and drive the notched disc 70. When the inner cam edge 116 engages the microswitch actuator 118 the microswitch 119 is not itself effective for reasons to be apparent hereafter the solenoid 104 may be energized independently of the microswitch 119 to maintain the clutch 100 engaged.

Also included for clutch activation is the second cam 120 fixed for rotation with the shaft 121 which is driven with the disc 70 as shown in FIGS. 3 and 3A. Associated with the cam 120 is a microswitch 122 having a movable actuator 122a which rides on the cam surface 123 of the cam 120. The cams 110 and 120 are designed such that cam 110 and switch 119 initiates energization of the solenoid 104 and engagement of the clutch 100 and maintain such solenoid energization and clutch engagement for a major portion of the interval that it is desired to rotate notched disc 70 with cam 120 and microswitch 122 continuing energization of the solenoid 104 and engagement of the clutch 100 after the cam 110 and switch 119 cease to be capable of energizing the solenoid and engaging the clutch and until such time as it is desired to stop rotation of the disc 70 whereupon the cam 120 which is fixed for movement with the disc 70 deactivates the switch 122 to de-energize the solenoid 104 and disengage the clutch 100 and brake the disc 70.

A switch 130 FIGS. 3, 11, 12 and 13A having a movable pivotal actuator 131 to which is pivotally secured a horizontal hanger-sensing foot 133 is fixedly mounted about the slick rail 26 such that the foot 133 overlies and rests on the upper edge 27 thereof. The opposite ends of the foot 133 are sightly upturned to permit the hook 21 of a hanger sliding down the slick rail 26 to easily move between the upper edge of the slick rail 26 and the foot 133 while raising the foot. The microswitch 130 is spaced above the upper edge of the slick rail 26 at a point such that the arm 131 does not pivot sufficiently to activate the switch 130 when a single hanger slides down the slick rail 26 and sequentially passes underneath foot sections 133a and 133b. When a single hanger slides down the slick rail 26, sequentially passing under foot sections 133a and 133b, the foot 133 sequentially pivots clockwise and counterclockwise, respectively, about actuator arm 131, as shown in FIGS. 11 and 12, respectively. The sequential clockwise and counterclockwise pivoting of the foot 133 pivots the actuator arm 131 slightly, but insufficiently to trip the switch 130. However, when hangers are stacked up on the slick rail 26 to a point such that hangers are located between the upper edge of the slick rail 26 and both foot sections 133a and 133b of the switch actuator arm 131 pivots sufficiently to activate the switch 130, as shown in FIG. 13.

When the switch 130 is activated by the stacking up of hanger hooks on the slick rail 26 to a point such that hooks underlie both switch foot sections 133a and 133b (FIG. 13), the motor EM which drives the endless conveyor 16 is actuated. As noted previously, when the conveyor 16 is driven the pin-bearing chain 86 is also driven as is the cam 110 which controls switch 119. When cam 110 initiates rotation, cam edge 115 at point 115a activates switch arm 118 tripping switch 119 to energize the solenoid 104 and engage the clutch 100. With the clutch 100 engaged the notched disc 70 rotates to transfer hangers present at the exit 77 of the slick rail 26 to the slick rail 80 (FIG. 3). Hangers so transferred are driven by the moving pins 87 along the slick rail 80 to the delivery end section 83 thereof where they slide down delivery edge 82 for transfer to the link 16a as described previously. Before the hangers being moved along slick rails 75 and 80 by disc 70 and pins 87 reach slick rail end 83, the conveyor 16 advances one link 16a past slick rail end 83, which link is therefore empty. When the cam 110 has rotated through an angle corresponding to slightly less than the time period necessary for three links to advance past the delivery end 83 of the slick rail 80, the end 115b of the cam edge 115 arrives at actuator 118 of microswitch 119, de-actuating the switch. The solenoid 104 does not, however, at this point become de-energized to disengage the clutch 100. Rather, solenoid energization is maintained by switch 112 which was actuated by cam surface 123 of cam 120 slightly before cam portion 115b of cam 110 reached microswitch arm 118 to de-actuate microswitch 119.

Referring again to FIG. 3 with the clutch 110 still enegaged the disc 70 continues rotating as does the shaft 121 and the cam 120. When the notched disc 70 reaches the desired final position corresponding to the desired start position of the disc for the next operational cycle, cam surface 123 of cam 120 deactuates switch 122 to de-energize the solenoid 104 and disengage clutch 100. Since cam 120 rotates with disc 70, the point at which switch 122 is de-activated to de-energize the solenoid 104 and disengage the clutch 100 is synchronized with the movement of the disc 70, assuring that the rotational position of the disc 70 at the point the clutch is disengaged will be the same from cycle to cycle.

Although the disc 70 has ceased rotating, the endless conveyor 16 continues to be driven and hangers on the slick rail 80 are transferred therealong by the chain-driven pin 87 until the last of the three links to be loaded has been fully loaded. When the third conveyor link has been filld with hangers, the conveyor 16 continues moving for a distance of one link until cam 125 mounted for movement with sprocket 92 trips a switch 126 which de-energizes the conveyor motor to terminate movement of the conveyor 18. The exact point at which the cam 125 trips the microswitch 126 to de-energize the conveyor motor and terminate movement of the conveyor 18 is selected such that one empty link will pass the delivery end 83 of the slick rail 80 before the switch 126 is tripped by the cam 125. This provides the desired two empty links between each group of three links onto which hangers are loaded.

When the cam 125 (FIG. 3) has tripped the switch 126 to terminate movement of the conveyor 16, the starting point 115a of cam edge 115 will be located at a point slightly spaced from switch actuating arm 118 such that when the hangers are once again stacked up on the slick rail 26 to a point sufficient to activate the swtich 130 and restart the conveyor motor EM, cam point 115a will immediately trip switch 118 to energize the solenoid 104 and engage the clutch 100 to initiate feeding of hangers by the notched disc 70.

As noted, the hangers first fed by the notched disc 70 at the beginning of the cycle reach the discharge end 83 of the slick rail 80 for deposit on the conveyor 16 only after the conveyor has been in motion for a time period sufficient to advance one empty hanger section past the discharge end 83 of the slick rail 80. This empty conveyor link, coupled with the empty conveyor link which passes past slick rail discharge end 83 at the end of a cycle following disengagement of the clutch 100 but before the conveyor terminates motion, constitute the desired two empty conveyor links between the three links onto which hangers are loaded. After the last conveyor link is loaded, only one empty link advances past slick rail delivery end 83 at which time switch 126 is energized to stop the conveyor 16. Stated differently, following de-energization of solenoid 104 and disengagement of clutch 100 which brakes disc 70, switch 126 operated by cam 125 which controls conveyor motor EM is not deactuated to stop the conveyor 16 until two links, one to be filled and one to be left empty, pass past slick rail discharge end 83.

As switch 180 (FIG. 3) having a pivotal actuator 181 and a pivotal foot 182 located above slick rail 26 is tripped when stacked hangers reach a point 184. Point 184 corresponds to the desirable limit of hangers on slick rail 26, and when it is reached and switch 180 actuated, either screw conveyor 10 stops or pick-off finger 44 of helix transfer unit 24 is switched to its hanger pass-through position.

The hanger unloading sub-system 22 (FIGS. 7 and 8) includes a slick rail 32 mounted to stationary bracket 30' which at its upper end picks off hangers from the conveyor links 16a proximate tunnel exit 14b for downward delivery under the force of gravity to exit end 150 where the screw conveyor loading mechanism 36 transports them upwardly where they are deposited onto the screw conveyor 10. The slick rail 32, considered in more detail, includes a pointed end 32a which is disposed adjacent the path of the conveyor links 16a such that they will pass inside the hook supported on the conveyor link element 16c as the conveyor link advances in the direction 160. As a conveyor link 16a advances in the direction of arrow 160 a hook supported on the conveyor link section 16c is threaded over the end 32a of the slick rail 32. Continued motion of the conveyor link 16a in the direction of arrow 160 causes the hanger to move upwardly along the slick rail section 32b. This upward movement is accomplished by reason of the pushing action on the hanger hook by the divider 16d of the advancing conveyor link 16a. As the conveyor link 16a continues to move in the direction of arrow 160 the hanger passes over a humped section 32c of the slick rail 32 at which point the free end of the hook is above the upper horizontal surface of the lower link element 16c. Continued motion of the link 16a causes the divider 16d to move the hanger beyond the humped slick rail section 32c whereupon the hanger slides down the inclined slick rail section 32d toward the exit end 150.

As a hanger sliding on section 32d (FIG. 7) arrives at the exit end 150, movable actuator arm 162 of the microswitch 163 is tripped by the hanger hook, energizing a drive motor 164. A notched disc 165 equivalent in structure and function to the notched disc 70 is driven by the motor 164. Associated with the notched disc 165 is a curved slick rail 167 equivalent in structure and function to the curved slick rail 75. When the drive motor 164 is energized in response to actuation of the trip arm 162 by a hanger entering the exit end 150 of slick rail 32d the notched disc 165 rotates in the direction of arrow 170. Rotation of the disc 165 causes the notches 171 to capture hanger hooks at the exit end 150 of slick rail section 32d and transport them along the curved slick rail section 167 where they are engaged by pins 173 driven by a chain 174 and advanced upwardly along a slick rail 176. Chain-driven pins 173 are equivalent in function and structure to pins 87.

The upper end section 177 (FIG. 7) of the slick rail 176 is inclined downwardly toward the screw conveyor 10. Hooks being transported upward on the slick rail section 176 by the chain-driven pins 173 eventually reach the delivery end section 177 of the slick rail 176 whereat they slide downwardly under the force of gravity for deposit on the screw conveyor 10.

In a preferred form of the invention (FIG. 9) the slick rail 176 is formed of two parallel sections located on either side of the path of the depending chain-driven pins 173. This insures that the hooks will be transported up the slick rail 176 by the pin 173.

The circuitry associated with the switch 163 preferably is designed such that once the switch 163 is tripped by engagement of a hanger with trip arm 162 and the motor 164 energized, the motor will remain energized for a period of time necessary to have the hanger hook which tripped the arm 162 be transported over curved slick rail section 167 by the notched disc 165 and up the slick rail section 176 by the chain-driven pin 173 until it is deposited on the screw conveyor 110.

Having described the invention, what is claimed is:

1. Apparatus for feeding hangers with a hook formed of wire having a predetermined diameter comprising:
   an elongated stationary slick rail having an input section, an output section, and a concave arcuate section with a specified radius of curvature located intermediate said input and output sections, said input, output and arcuate sections being stationary and free of hook-impeding obstructions and positioned to permit a hanger hook to be continuously supported thereby and smoothly slide sequentially therealong,
   a circular disc having a peripheral edge with notches therein circumferentially spaced at predetermined distances and having a radius substantially equal to said specified radius of said arcuate slick rail section, said disc having an axis of rotation and being rotationally mounted with its peripheral edge overlying and spaced from said arcuate slick rail section a distance less than said hook wire diameter, and
   a first drive connected to said disc for rotating it about said axis at a given angular velocity to move said notched disc relative to said arcuate slick rail section for positively slidably transferring hangers engaged in said notches while continuously supported by said slick rail sections from said input slick rail section to said output slick rail section via said arcuate section with a spacing therebetween correlated to said distance between notches and at a transfer velocity correlated to said angular velocity of said disc.

2. The apparatus of claim 1 wherein said input slick rail section is inclined downwardly toward said arcuate slick rail section to gravity feed hanger hooks into engagement with said disc notches for positive transfer by said notched disc over said arcuate slick rail section to said output slick rail section.

3. The apparatus of claim 1 further including:
   an endless flexible member having hood-engaging elements projecting therefrom, said member being trained over spaced apart supports located to position a run of said endless flexible member parallel to said output slick rail section with said projecting elements in hook-engaging relation to hanger hooks slidably supported on said output slick rail section,
   a second drive connected to one of said supports for moving said run relative to said output slick rail section to positively advance therealong hangers having hooks engaged by said projecting elements of said flexible member run.

4. The apparatus of claim 3 wherein said output slick rail section is inclined upwardly from said arcuate section to facilitate positive sliding transfer of said hangers engaged by said projecting elements over said output slick rail section to a higher elevation.

5. The apparatus of claim 3 wherein said projecting elements are approximately equally spaced from each other, and wherein said second drive moves said run at a velocity correlated to said angular velocity of said disc to facilitate advancing said hangers on said output slick rail section at a spacing correlated to the transfer velocity of said hangers.

6. The apparatus of calim 3 further including:
   a moving conveyor for positively advancing, when operative, hangers deposited thereon,
   said output slick rail section having a hanger delivery end remote from said arcuate slick rail section to which hangers are advanced by said projecting elements,
   said moving conveyor having a section located proximate said delivery end of said output slick rail section for receiving deposit of hangers advanced to said output slick rail section hanger delivery end for further transport by said moving conveyor.

7. The apparatus of claim 6 wherein said moving conveyor has individual hook-receiving slots for positively engaging hangers deposited thereon and transporting said deposited hangers at spacings therebetween correlated to the rate at which said hangers are deposited on said moving conveyor.

8. The apparatus of claim 6 wherein said moving conveyor and said first drive and notched disc are cycled intermittently to transport hangers on a batch basis from said input slick rail section to a processing station associated with said moving conveyor located remote from said output slick rail section hanger delivery end, said apparatus further including a first hook sensor associated with said input slick rail section for sensing the presence of a predetermined accumulation of hangers on said input slick rail section, said hangers accumulating on said input slick rail section during an accumulation interval, said first sensor being operative to control movement of said notched disc and said moving conveyor in response to the presence of said predetermined hanger accumulation to transfer said accumulated hangers from said input slick rail section to said moving conveyor via said arcuate and output slick rail sections for transport to said processing station on a batch basis, said notched disc being inoperative, to prevent hanger transfer between said input and output slick rail sections, during said accumulation interval.

9. The apparatus of claim 8 further including:
a clutch,
a third drive connected to said moving conveyor for imparting movement thereto, said first drive for said disc being selectively connected to said third drive via said clutch,
means associated with said third drive for initiating engagement of said clutch at a predetermined point in the intermittent movement cycle of said moving conveyor, and
means associated with said first drive for terminating engagement of said clutch at a predetermined point in the intermittent movement cycle of said notched disc to assure said disc returns to the same predetermined rotational orientation at the end of each said intermittent cycle independently of said third drive and moving conveyor.

10. The apparatus of claim 8 wherein:
said output slick rail section has a hanger-receiving end remote from said disc,
a second movable conveyor for transporting hangers, said second movable conveyor having a section located proximate said hanger-receiving end of said input slick rail section for transferring hangers from said second movable conveyor to said input slick rail section via said hanger-receiving end,
a second hook sensor associated with said input slick rail section at a point between said first sensor and said hanger-receiving end of said input slick rail section for sensing the presence of an overload accumulation of hangers on said input slick rail section in an amount exceeding said predetermined amount, and
means responsive to said second hook sensor for terminating transfer of said hangers from said second movable conveyor to said input slick rail section when said input slick rail section is overloaded.

11. The apparatus of claim 1 including an elongated element having an edge disposed substantially parallel to said input slick rail section and spaced therefrom at a distance slightly greater than said predetermined diameter of said hook wire to preclude the hooks of multiple hangers stacked on said input slick rail section from crossing one over another.

* * * * *